(12) United States Patent
Jonasson et al.

(10) Patent No.: US 10,144,433 B2
(45) Date of Patent: Dec. 4, 2018

(54) METHOD AND ARRANGEMENT FOR TIRE TO ROAD FRICTION ESTIMATION

(71) Applicant: VOLVO CAR CORPORATION, Gothenburg (SE)

(72) Inventors: Mats Jonasson, Partille (SE); Tony Gustafsson, Askim (SE); Anton Albinsson, Gothenburg (SE); Frederik Hans Bruzelius, Molndal (SE)

(73) Assignee: VOLVO CAR CORPORATION (SE)

( * ) Notice: Subject to any disclaimer, the term of this patent is extended or adjusted under 35 U.S.C. 154(b) by 251 days.

(21) Appl. No.: 15/177,398

(22) Filed: Jun. 9, 2016

(65) Prior Publication Data

US 2016/0368503 A1   Dec. 22, 2016

(30) Foreign Application Priority Data

Jun. 16, 2015  (EP) .................................... 15172369

(51) Int. Cl.
    *B60W 40/068*   (2012.01)
    *B60T 8/172*   (2006.01)
    *B60R 16/023*   (2006.01)

(52) U.S. Cl.
    CPC ......... *B60W 40/068* (2013.01); *B60R 16/023* (2013.01); *B60T 8/172* (2013.01); *B60T 2210/12* (2013.01); *B60W 2520/28* (2013.01)

(58) Field of Classification Search
    None
    See application file for complete search history.

(56) References Cited

U.S. PATENT DOCUMENTS

| 2005/0038588 A1* | 2/2005 | Shukla | .................. B60T 8/1755 |
| | | | 701/70 |
| 2005/0038589 A1* | 2/2005 | Shukla | ................... B60T 8/172 |
| | | | 701/80 |

(Continued)

FOREIGN PATENT DOCUMENTS

| DE | 3516399 A1 | 11/1986 |
| DE | 10122808 A1 | 11/2002 |

(Continued)

OTHER PUBLICATIONS

Extended European Search Report dated Jan. 5, 2016, Application No. 15172369.9-1756, Applicant Volvo Car Corporation, 4 Pages.

*Primary Examiner* — Justin Holmes
(74) *Attorney, Agent, or Firm* — Brooks Kushman P.C.

(57) ABSTRACT

The present disclosure relates to a method and arrangement for estimating a friction coefficient ($\mu_i$) between tires of a wheeled two-axis two-track road vehicle and the ground. If the longitudinal velocity $v_x$ of the vehicle is above a first threshold $v_{xthres}$ and the wheel angle $\delta_f$ and/or the yaw rate $\Omega_z$ are/is below a second threshold $\delta_{thres}/\Omega_{zthres}$, a positive torque is applied to both wheels on a first axle and an and opposite, negative torque, to both wheels on a second axle while following driver requested longitudinal vehicle acceleration ($a_x$). Wheel speeds $\omega_i$ are measured and tire forces ($f_i$) estimated. The friction coefficient ($\mu_i$) between the tires and the ground are estimated from the measured wheel speeds $\omega_i$ and the estimated tire forces ($f_i$). The estimated friction coefficient ($\mu_i$) is made available to other vehicle systems.

20 Claims, 6 Drawing Sheets

(56) References Cited

U.S. PATENT DOCUMENTS

2010/0131165 A1\* 5/2010 Salman .................. B60T 8/172
  701/70
2015/0314759 A1\* 11/2015 Nicolet ................ B60T 8/1755
  701/70

FOREIGN PATENT DOCUMENTS

DE  102008041034 A1  2/2010
EP        1481861 A1  12/2004

\* cited by examiner

| $\dfrac{\mu_{util,max}}{N}$ | 0.3 | 0.4 | 0.5 | 0.6 | 0.7 | 0.8 |
|---|---|---|---|---|---|---|
| 10 | 0.7787 | 0.4184 | 0.2203 | 0.1357 | 0.0784 | 0.0471 |
| 60 | 0.3383 | 0.1820 | 0.0961 | 0.0593 | 0.0344 | 0.0207 |
| 110 | 0.2514 | 0.1353 | 0.0714 | 0.0441 | 0.0255 | 0.0154 |
| 160 | 0.2089 | 0.1124 | 0.0593 | 0.0366 | 0.0212 | 0.0128 |
| 210 | 0.1825 | 0.0982 | 0.0519 | 0.0320 | 0.0186 | 0.0112 |
| 260 | 0.1642 | 0.0883 | 0.0466 | 0.0288 | 0.0167 | 0.0101 |
| 310 | 0.1504 | 0.0809 | 0.0427 | 0.0264 | 0.0153 | 0.0092 |
| 360 | 0.1396 | 0.0751 | 0.0397 | 0.0245 | 0.0142 | 0.0086 |
| 410 | 0.1309 | 0.0704 | 0.0372 | 0.0230 | 0.0133 | 0.0080 |
| 460 | 0.1236 | 0.0665 | 0.0351 | 0.0217 | 0.0126 | 0.0076 |

Fig. 3

| $\dfrac{\mu_{util,max}}{N}$ | 0.1 | 0.2 |
|---|---|---|
| 10 | 0.6196 | 0.1001 |
| 60 | 0.2693 | 0.0438 |
| 110 | 0.2001 | 0.0325 |
| 160 | 0.1663 | 0.0271 |
| 210 | 0.1453 | 0.0236 |
| 260 | 0.1307 | 0.0213 |
| 310 | 0.1197 | 0.0195 |
| 360 | 0.1112 | 0.0181 |
| 410 | 0.1042 | 0.0170 |
| 460 | 0.0984 | 0.0160 |

Fig. 4

METHOD AND ARRANGEMENT FOR TIRE TO ROAD FRICTION ESTIMATION

CROSS-REFERENCE TO RELATED APPLICATIONS

This application claims foreign priority benefits under 35 U.S.C. § 119(a)-(d) to European patent application number EP 15172369.9, filed Jun. 16, 2015, which is incorporated by reference in its entirety.

TECHNICAL FIELD

Embodiments herein relate to a method and arrangement for estimating a friction coefficient between tires of a wheeled two-axis two-track road vehicle and the ground.

BACKGROUND

Vehicle motion is highly dependent on the friction coefficient, i.e., the friction between the tires and the ground. Therefore an accurate estimate of this friction is valuable for many active vehicle safety functions, such as collision avoidance. For example, if low friction between the tires and the ground can be detected braking intervention can be performed earlier in a dangerous situation, and thus the risk of collision and serious injuries be reduced.

This is especially relevant for autonomous vehicles, as it is expected that autonomous driving will require estimates of the friction between the tires and the ground in order to adapt the vehicle speed (also referred to as velocity) automatically. This is relevant as e.g., driving too fast on a low friction surface, i.e., with low friction between the tires and the ground, could cause hazards such as skidding.

However, since it is assumed that the friction between the tires and the ground is difficult and costly to measure, the research society and automotive industry has been focusing on friction estimation, where "no-contact-to-ground" sensors are used, e.g., inertial measurement units, wheel-speed sensors, laser scanners, etc. A particular class of methods relies on knowledge of the physics of the tire where the relation between slip and tire force is known. A majority of the publications relating to such methods has hitherto shown that the tires must be significantly excited in order to enable such estimation, which means that the vehicle must e.g., either accelerate longitudinally or corner to exhibit large tire forces. An implication of that is consequently that during normal driving, where such excitation maneuvers occur stochastically at irregular intervals, it will be difficult or impossible to estimate the friction coefficient as sufficient excitation therefor is lacking.

One attempt at providing a method and apparatus for estimating road-to-tire friction between tires of a wheeled vehicle and a road surface, upon demand without disturbing a driver of the wheeled vehicle, is provided by document EP1481861 A1, which relates to a method for estimating the tire to road friction in order to enable an adaptation of a collision avoidance system to current road friction conditions. It suggests the use of a risk estimation module of a collision avoidance system to determine when to perform an automatic excitation of the tire-to-road contact surfaces, to enable estimation of the maximum available tire to road friction.

Automatic excitation, according to document EP1481861 A1, is performed when the collision risk estimated by the collision avoidance system exceeds a predetermined limit value. This limit value will be lower than the threshold value or values, which will actually trigger a collision avoidance intervention or collision warning by the collision avoidance system. It is further suggested to use the estimated friction to influence the decision mechanisms of the collision avoidance system, assuming that the estimated maximum friction level immediately in front of the vehicle will be the same or similar to the current conditions at the time of the excitation.

In accordance with document EP1481861 A1, a positive, driving torque is applied to both wheels on a first axle and an equal and opposite, negative, braking torque to at least one wheel on a second axle. Current values for vehicle speed, angular acceleration of the wheel on the second axle and the negative torque applied to said wheel are measured. A current friction coefficient is determined using a friction coefficient determining means. The positive torque may be applied by means of a propulsion unit connected to the first axle through a drivetrain for driving one or more wheels on the first axle, and the negative torque may be applied by actuating braking means for said at least one wheel on the second axle. It is said that in this way the driver of the vehicle will not experience a change in vehicle speed or an unexpected acceleration caused by the application of the brakes while the procedure for estimating the maximum available tire-to-road friction coefficient is performed.

However, although document EP1481861 A1 discloses that a friction coefficient determining means is used for determining a current friction coefficient from measured current values for vehicle speed, angular acceleration of the wheel on the second axle and the negative torque applied to said wheel, document EP1481861 A1 provides no further detail as to how this determination of the current friction coefficient is to be performed.

Vehicle speed, as required by document EP1481861 A1, is unfortunately very hard to estimate when all wheels are either braked or propelled since all wheels then will have high slip, and hence wheel speed sensors will not provide accurate values and thus give no clue as to the actual vehicle speed.

Thus, there is room for improving upon the previously suggested friction determination methodologies.

SUMMARY

Embodiments herein aim to provide an improved method for estimating a friction coefficient between tires of a wheeled two-axis two-track road vehicle and the ground which does not require knowledge about the vehicle speed.

This is provided through a method that comprises the steps of: if the longitudinal velocity of the vehicle is above a first threshold and the wheel angle and/or the yaw rate are/is below a respective second threshold, applying a positive torque to both wheels on a first axle and an and opposite, negative torque, to both wheels on a second axle while following driver requested longitudinal vehicle acceleration; measuring wheel speeds; estimating tire forces; estimating the friction coefficient between the tires and the ground from the measured wheel speeds and the estimated tire forces; making the estimated friction coefficient available to other vehicle systems.

The provision of estimating the friction coefficient between the tires and the ground from the measured wheel speeds and the estimated tire forces and making the estimated friction coefficient available to other vehicle systems, as above, enables the provision of friction estimates to any vehicle systems requiring such in a non-intrusive manner whilst the vehicle is travelling essentially straight ahead.

According to a second aspect is provided that application of the positive torque is made using a vehicle propulsion system and application of the negative torque is made using a vehicle braking system.

The provision of applying the positive and the negative torque using vehicle propulsion and braking systems respectively, as above, conveniently provides for nonintrusive excitement of the tires such that the measurement required for the estimation can be performed.

According to a third aspect is provided that the wheel speeds are measured using wheel speed sensors.

The provision of measuring the wheel speeds using wheel speed sensors, as above, provides for convenient and normally, as most vehicles today are equipped with such sensors, low cost measurements.

According to a fourth aspect is provided that the tire forces are estimated from measurements of vehicle acceleration and yaw rate provided by a vehicle inertial measurement unit.

The provision of estimating the tire forces are from measurements of vehicle acceleration and yaw rate provided by a vehicle inertial measurement unit, as above, provides for convenient and normally, as most vehicles today are equipped with such an inertial measurement unit, low cost measurements.

According to a fifth aspect is provided that the friction coefficient is estimated using a tire model comprising a physical relationship between wheel slip and tire forces.

The provision of estimating the friction coefficient using a tire model comprising a physical relationship between wheel slip and tire forces, as above, makes it possible to provide a useful estimate without a, as mentioned above, difficultly determined knowledge of the vehicle longitudinal velocity.

According to a sixth aspect is provided that the tire model is a brush model.

The provision of the tire model being a brush model, as above, provides for using a tire model comprising a physical relationship between wheel slip and tire forces that is well known to a person skilled in the art, and facilitates the use of standard signal processing tools such as extended Kalman filtering, particle filtering, grid search, etc., to estimate the friction coefficient.

According to a seventh aspect is provided that the friction coefficient is estimated using a parametric tire-force model.

The provision of the tire model being a parametric tire-force model, as above, facilitates the use of standard signal processing tools such as extended Kalman filtering, particle filtering, grid search, etc., to estimate the friction coefficient.

According to an eight aspect is provided that the tire model is a curve-fit model.

The provision of the tire model being a curve-fit model, as above, is beneficial as there normally will be an analytic inverse model readily available.

According to a ninth aspect is provided that the method further comprises estimating longitudinal tire stiffness parameters using Kalman filtering or similar signal processing tool during driving situations where an applied normalized traction force is small.

The provision of estimating longitudinal tire stiffness parameters using Kalman filtering or similar signal processing tool during driving situations where an applied normalized traction force is small, as above, provides for ensuring that the estimated tire stiffness is not affected by the friction.

According to a tenth aspect is provided the estimated friction coefficient is made available to other vehicle systems on a vehicle information network, such as a controller area network (CAN bus), Media Oriented Systems Transport (MOST) network.

The provision of making the estimated friction coefficient available to other vehicle systems on a vehicle information network, as above, provides for convenient and normally, as most vehicles today are equipped with such vehicle information networks, low cost distribution of the estimated friction coefficient to vehicle systems for which access thereto would be beneficial.

Further embodiments herein aim to provide an improved arrangement for estimating a friction coefficient between tires of a wheeled two-axis two-track road vehicle and the ground which does not require knowledge about the vehicle speed, thus according to an eleventh aspect is provided such an arrangement comprising: an activation logic for determining if the longitudinal velocity of the vehicle is above a first threshold and the wheel angle and/or the yaw rate are/is below a respective second threshold; a vehicle controller for applying a positive torque to both wheels on a first axle and an and opposite, negative torque, to both wheels on a second axle while following driver requested longitudinal vehicle acceleration if determined that the longitudinal velocity of the vehicle is above a first threshold and the wheel angle and/or the yaw rate are/is below a respective second threshold; wheel speed sensors for measuring wheel speeds; a tire force estimating unit; a friction estimator for estimating the friction coefficient between the tires and the ground from the measured wheel speeds and the estimated tire forces; and a communication unit for making the estimated friction coefficient available to other vehicle systems.

The provision of estimating the friction coefficient between the tires and the ground from the measured wheel speeds and the estimated tire forces and making the estimated friction coefficient available to other vehicle systems, as above, enables the provision of friction estimates to any vehicle systems requiring such in a non-intrusive manner whilst the vehicle is travelling essentially straight ahead.

According to a twelfth aspect is provided that the friction estimator is arranged to estimate the friction coefficient between the tires and the ground using a tire model comprising a physical relationship between wheel slip and tire forces.

The provision of estimating the friction coefficient using a tire model comprising a physical relationship between wheel slip and tire forces, as above, makes it possible to provide a useful estimate without a, as mentioned above, difficultly determined knowledge of the vehicle longitudinal velocity.

According to a thirteenth aspect is provided that the tire model comprising a physical relationship between wheel slip and tire forces is a brush model.

The provision of the tire model being a brush model, as above, provides for using a tire model comprising a physical relationship between wheel slip and tire forces that is well known to a person skilled in the art, and facilitates the use of standard signal processing tools such as extended Kalman filtering, particle filtering, grid search, etc., to estimate the friction coefficient.

According to a fourteenth aspect is provided that the tire model comprising a physical relationship between wheel slip and tire forces is a parametric tire-force model.

The provision of the tire model being a parametric tire-force model, as above, facilitates the use of standard signal processing tools such as extended Kalman filtering, particle filtering, grid search, etc., to estimate the friction coefficient.

According to a final aspect is provided a wheeled two-axis two-track road vehicle which comprises an arrangement for estimating a friction coefficient between tires of a wheeled two-axis two-track road vehicle and the ground, as above.

A wheeled two-axis two-track road vehicle which comprises an arrangement for estimating a friction coefficient between tires of a wheeled two-axis two-track road vehicle and the ground, as above, is able to provide friction estimates to any vehicle systems requiring such in a non-intrusive manner whilst the vehicle is travelling essentially straight ahead.

BRIEF DESCRIPTION OF THE DRAWINGS

In the following, embodiments herein will be described in greater detail by way of example only with reference to attached drawings.

FIG. 3 is a table illustrating standard deviation of friction estimates for $\mu=1$;

FIG. 4 is a table illustrating standard deviation of friction estimates for $\mu=0.3$;

Figure 1:
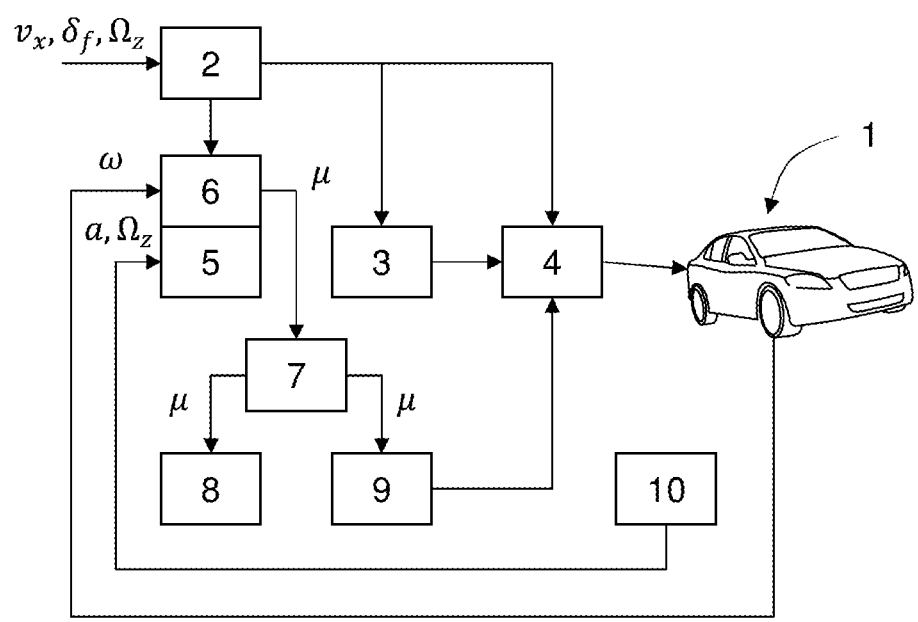
FIG. 1 is a schematic outline of the architecture of a friction estimator according to embodiments herein.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

In overview embodiments herein relate to a method and an arrangement for estimating a friction coefficient $\mu$ between tires of a wheeled two-axis two-track road vehicle 1 and the ground/road while following driver requested longitudinal vehicle acceleration $a_x$.

The method relies on knowledge of the physics between a tire's slip s and it's force f. In order to excite the tires significantly, it is suggested to perform the estimation during a particular designed actuation of the vehicle 1. This actuation is done by generating a positive (traction) torque on a front axle while simultaneously generating a negative (braking) torque on a rear axle, or vice versa, under the condition that a driver/vehicle requested longitudinal acceleration $a_x$ is unaffected, i.e., while following driver requested longitudinal vehicle acceleration. This means for example that vehicle 1 speed during cruise control should be kept constant.

According to embodiments herein application of the positive torque is made using a vehicle 1 propulsion system (not shown) and application of the negative torque is made using a vehicle 1 braking system (not shown).

A particular problem addressed herein is that friction coefficient $\mu$ estimation, as it is described in the literature and in prior-art patent publications, requires vehicle speed/velocity v information, c.f., e.g., EP1481861 A1 discussed earlier in the background section of this application.

Vehicle speed v is unfortunately very hard to estimate when all wheels of the vehicle 1 are either braked or propelled, since all wheels of the vehicle 1 then will have high slip s, and hence wheel speed sensors will not provide accurate values and thus will give no clue as to the actual vehicle speed v.

The proposed method and arrangement solve that issue in that the suggested friction coefficient $\mu$ estimation algorithms don't require knowledge about the speed v of the associated vehicle 1. This is achieved based on the insight that the effect of the longitudinal velocity $v_x$ of the vehicle 1 is small as long as the longitudinal velocity $v_x$ is large and the wheel angle $\delta$ and/or the yaw rate $\Omega_z$ thereof are/is small, e.g., when the vehicle 1 is travelling essentially straight ahead above a certain threshold speed $v_{thres}$. This can e.g., be established through determining if the longitudinal velocity $v_x$ of the vehicle 1 is above a first threshold $v_{thres}$ and the wheel angle $\delta$ and/or the yaw rate $\Omega_z$ are/is below a second threshold $\delta_{thres}/\Omega_{zthres}$. The wheel angle $\delta$ here being the angle of a pair of steerable wheels, either at the front or rear axle of the vehicle 1. Each second threshold $\delta_{thres}$, $\Omega_{zthres}$ being selected to ensure that the vehicle 1 is travelling approximately straight ahead, i.e., such that any lateral acceleration $a_y$ of the vehicle 1 is low, or more to the point, that the lateral excitation/side slip of the tires of the vehicle 1 is low. While each first and second threshold may vary depending on the vehicle, an example first threshold $v_{thres}$ may be 10 m/s or greater, an example second threshold $\delta_{thres}$ for the wheel angle $\delta$ may be 20 degrees or less, and an example second threshold $\Omega_{zthres}$ for the yaw rate $\Omega_z$ may be 40 degrees/s or less. However, if the second threshold $\delta_{thres}$ for the wheel angle $\delta$ and the second threshold $\Omega_{zthres}$ for the yaw rate $\Omega_z$ are each smaller, then the first threshold $v_{thres}$ could also be smaller (e.g., 4 m/s generally). Therefore, making suitable assumptions, this will allow for eliminating the longitudinal velocity $v_x$ of the vehicle 1 from the equations used herein for determining the tire to road friction coefficient $\mu$, as will be described in more detail in the following.

The architecture of a friction estimator in accordance with the proposed method and arrangement is outlined in FIG. 1.

When there is a need to estimate the friction coefficient $\mu$ and it is expected that the estimation function can be executed without risking stability of the vehicle 1 or result in unacceptable discomfort to vehicle 1 occupants, an activation logic 2 activates the function by selecting a first vehicle controller 3 in a control arbitrator 4. Hereby axle torque requests from the specifically designed estimation function, as described herein, will pass through to the vehicle 1, or more specifically to underlying controllers (not shown) that control the brake and propulsion systems of the vehicle 1.

Thus, according to embodiments herein an arrangement for estimating a friction coefficient $\mu$ between tires of a wheeled two-axis two-track road vehicle 1 and the ground, comprises: an activation logic 2 for determining if the longitudinal velocity $v_x$ of the vehicle 1 is above a first threshold $v_{xthres}$ and the wheel angle $\delta$ and/or the yaw rate $\Omega_z$ are/is below a respective second threshold $\delta_{thres}/\Omega_{zthres}$, i.e., that the estimation function can be executed without risking stability of the vehicle 1 or result in unacceptable discomfort to vehicle 1 occupants; a first vehicle controller 3 for applying a positive torque to both wheels on a first axle and an and opposite, negative torque, to both wheels on a second axle while following driver requested longitudinal vehicle acceleration $a_x$ if determined that the longitudinal velocity $v_x$ of the vehicle 1 is above a first threshold $v_{xthres}$ and the wheel angle δ and/or the yaw rate $\Omega_z$ are/is below a respective second threshold $δ_{thres}$, $\Omega_{zthres}$; wheel speed sensors (not shown) for measuring wheel speeds ω; a tire force f estimating unit 5; a friction estimator 6 for estimating the friction coefficient μ between the tires and the ground from the measured wheel speeds ω and the estimated tire forces f; and a communication unit 7 for making the estimated friction coefficient μ available to other vehicle systems 8, such as a collision avoidance system, road friction information to driver system, curve speed adaption system, autonomous driving system, etc.

A second vehicle controller 9 represents all other controllers in the vehicle (not shown) that may request axle torques, and they are also, possibly among others, receivers of the friction coefficient μ information. An example of such a receiver of the friction coefficient μ information is a collision avoidance brake algorithm, which is assumed to reside within the second vehicle controller 9. There could also be other receivers of friction coefficient μ estimates, e.g., means for providing information to be sent to a display (not shown) in the vehicle 1, e.g., for providing information to a driver thereof, or to other vehicles/receivers in the surrounding of the ego vehicle 1. The control arbitrator 4 arbitrates axle torque requests from the specifically designed estimation function and axle torque requests from all other controllers in the vehicle that may request axle torques, such that driver requested longitudinal vehicle acceleration $a_x$ is followed. In this way it is possible to provide friction coefficient μ estimates to any vehicle systems requiring such in a non-intrusive manner.

The friction estimator 6 estimates friction μ based on measurements of wheel speeds ω of the vehicle 1, e.g., measured using wheel speed sensors, and estimates of tire forces f, which in turn are estimated from an inertial measurement unit 10, e.g., providing measurements of vehicle acceleration a and yaw rate $\Omega_z$, as will be described in more detail below.

In embodiments herein the friction estimator 6 is arranged to estimate the friction coefficient μ between the tires and the ground using a tire model comprising a physical relationship between wheel slip s and tire forces f.

According to embodiments herein the tire model comprising a physical relationship between wheel slip s and tire forces f is either a brush model or a parametric tire-force model, such as a curve-fit model.

The friction estimator 6 gives the first vehicle controller 3 commands representative of how the control should be done, as also will be described in more detail below.

The proposed estimation algorithms require a minimum friction utilization level of the tires, and a minimum time duration of the minimum friction utilization level.

Thus, the friction utilization may be described as:

$$\text{friction utilization} = \frac{fx_i}{\mu_i \times fz_i}$$

Where
$fx_i$ is the longitudinal tyre force,
$\mu_i$ is the tire-to-road friction coefficient, and
$fz_i$ the normal load of the tyre.

Note that in the following index i is used to identify the different tires according to Front Left tire i=1, Front Right tire i=2, Rear Left tire i=3, and Rear Right tire i=4.

A problem encountered is that different surfaces requires different rate of increase in applied axle torque. If we would for instance use a ramp therefore, with the same gradient on a high- and a low-friction surface, the number of measurement samples possible for the friction estimator to acquire on the low friction surface would be limited. Thus it is proposed to instead increase the torque applied to a front axle of the vehicle 1 as illustrated schematically by the uppermost curve according to FIG. 2, which figure illustrates applied axle torque as a function of time.

Figure 2:
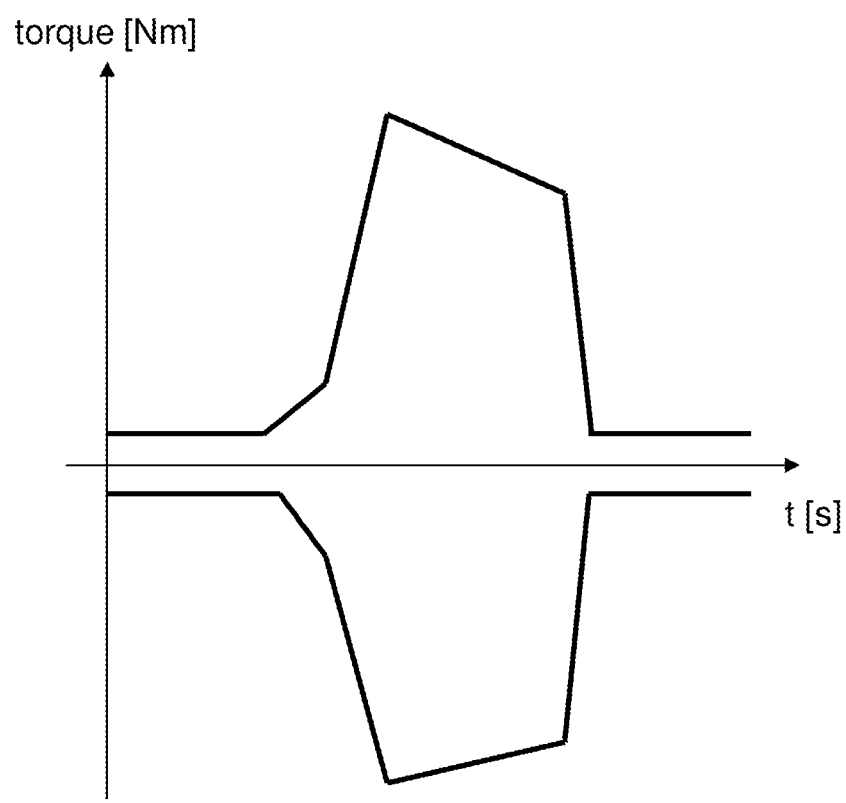
FIG. 2 is a schematic illustration of principal actuation axle torque as a function of time.

As illustrated in FIG. 2, a small gradient is used in the beginning of the manoeuvre in order to estimate the slip stiffness C of the tires. This is done since all tire models rely on at least two parameters, the stiffness C and the friction μ. As will be well known to the person skilled in the art, the stiffness C describes the linear part in a slip-force plot. By having a ramp with a small gradient at the start of the manoeuvre the rest of the measured data can be used to estimate the friction coefficient μ.

After this initial low gradient ramp a much faster ramp follows. This ramp increases the axle torque until it violates one of a number of predetermined conditions for decreasing the torque. These conditions include but are not limited to, difference in wheel speed front/rear on the left and right side of the vehicle, difference in wheel angular acceleration front/rear, differences for all wheels individually, the utilized friction being too close to an estimated maximum friction coefficient, the utilized friction being higher than a predetermined maximum threshold. Depending on which one of these conditions that is violated, the torque is either slowly increased or decreased before a ramping down starts. This actuation method makes the intervention take the same amount of time regardless of the friction coefficient μ since the time can be set. It also allows the friction estimator 6 to collect measurement data at a level of excitation which is suitable for friction μ estimation, in the nonlinear tire region.

Meanwhile, the rear axle torque should be decreased, as illustrated by the lowermost curve of FIG. 2, to maintain an unaffected driver requested longitudinal vehicle acceleration $a_x$. This means conceptually that the rear axle torque should be actuated with opposite sign compared with the front axle torque, but since the individual axles/actuators may have different transfer functions (response time, gains) and uncertainties one need to control the rear axle torque in order to maintain the driver requested longitudinal acceleration $a_x$ unaffected.

Note that instead of braking the rear axle and using traction of the front axle it is possible to brake at the front axle and use traction of the rear axle instead. In embodiments hereof application of the positive torque is made using a vehicle 1 propulsion system and application of the negative torque is made using a vehicle 1 braking system.

In order to see how many samples the friction estimator 6 ideally would need in order to estimate the friction μ the Cramer-Rao Lower Bound (CRLB) is studied. The CRLB shows the minimum variance of the parameter estimation that can be achieved by any estimator. Note that it might not be possible to find an estimator that can attain the CRLB but it gives an idea of the minimum number of samples and friction utilization needed. The CRLB, presented in the tables of FIGS. 3 and 4, assumes that the tire characteristics can be perfectly described by a brush model, well known to a person skilled in the art. The variance of the noise matches that currently found on a rear axle force estimation. The columns are the maximum utilized friction $\mu_{util,max}$ during the actuation and the rows corresponds to the number N of measurement samples collected up to this friction utilization. For instance if a maximum friction utilization of 0.5 is used and the estimator collects 160 measurement samples we would be able to say that the friction coefficient $\mu$ is within $1 \pm 0.0593 \times 2 = 1 \pm 0.12$ with 95% certainty given that the noise on the force estimation is white Gaussian noise with zero mean and that the brush model describes the tire characteristics perfectly.

In a real vehicle 1 there are other uncertainties as well, there is noise present on the wheel speed $\omega$ signals and the tire can most likely not be described perfectly by the brush model. This means that more samples and higher friction utilization is needed for a real vehicle 1. However the CRLB provides the minimum requirements on excitation level and number of samples.

To sum up, to get good certain estimates of the friction $\mu$ the axle torque in FIG. 2 should be large and last for long time. However, if both magnitude and duration are large there is a risk for instability or discomfort and, at least one of them (magnitude, duration) must then be decreased. The Cramer-Rao Lower Bound explains how the trade-off should be tackled to get a desired certainty.

In the following will now be described signal processing algorithms for estimation of the tire/road friction coefficient $\mu$. The studied algorithms are tailor made to the scenario where a positive torque is applied on the front axle of a two-axle vehicle, and a negative torque is applied on the rear axle (or vice versa). This special torque excitation scenario occurs when there is a request to measure the tire/road friction $\mu$ while following driver requested longitudinal vehicle acceleration $a_x$. If both wheel axles are equipped with electrical machines the friction $\mu$ measurement can be performed silently; i.e., the driver will not notice that a friction $\mu$ measurement is on-going.

Figure 5:
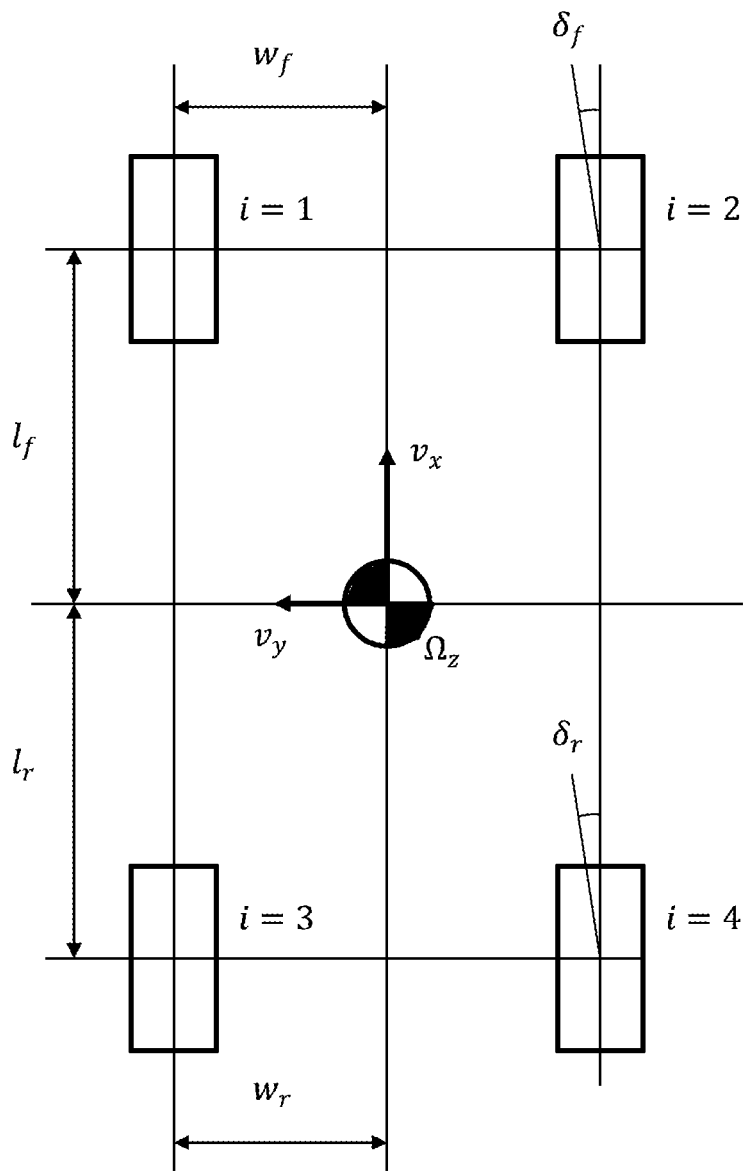
FIG. 5 is a schematic illustration of a vehicle geometry of a wheeled two-axis two-track road vehicle according to embodiments herein.

Below some useful basic facts about the wheel velocities are derived. The vehicle geometry, as illustrated in FIG. 5, is as follows:

$l_f$: Longitudinal distance from center of gravity to the front axle.
 $l_r$: Longitudinal distance from center of gravity to the rear axle.
 $w_f$: Half front track width.
 $w_r$: Half rear track width.

Assume that the vehicle is moving in the plane and that the longitudinal and lateral vehicle velocity expressed in the center-of-gravity coordinate system is $v_x$ and $v_y$, respectively. Suppose also that the vehicle yaw-rate is $\Omega_z$. The basic relation we use next is that the velocity vector $v^P$ at a point P which is rotating with rate $\Omega_z$ relative the center-of-gravity coordinate system is:

$$v^P = v + \begin{bmatrix} 0 \\ 0 \\ \Omega_z \end{bmatrix} \times P \qquad \text{Eq. (1)}$$

Here $v = [v_x\ v_y\ 0]^T$ is the velocity vector at the center of gravity, and $v^P = [v_x^P\ v_y^P\ 0]^T$. Note that all velocity components are expressed using a vehicle attached center-of-gravity coordinate system. As mentioned above, in the following we use the short hand notation where index i is used to identify the different tires according to Front Left tire i=1, Front Right tire i=2, Rear Left tire i=3, and Rear Right tire i=4.

Figure 6:
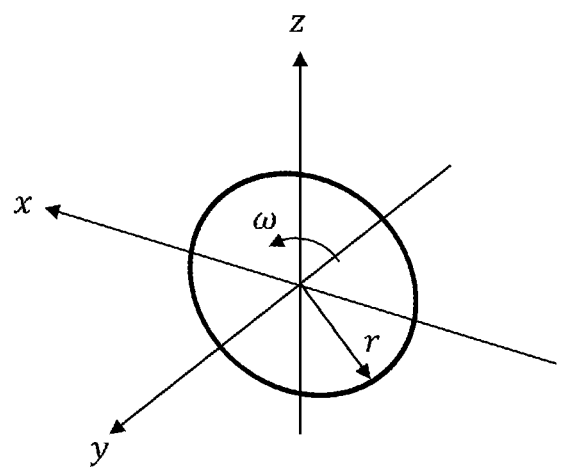
FIG. 6 is a schematic illustration of a local tire coordinate system.

Assume that the front and rear wheels have steering angles $\delta_f$ and $\delta_r$, respectively, i.e., index f indicating front and index r indicating rear. The longitudinal component of the wheel velocity in a local tire coordinate system, as illustrated in FIG. 6, is thus related to the vehicle center of gravity velocities as follows:

$$\begin{bmatrix} v_x^{P1} \\ v_x^{P2} \\ v_x^{P3} \\ v_x^{P4} \end{bmatrix} = \begin{bmatrix} (v_x - w_f\Omega_z)\cos\delta_f + (v_y + l_f\Omega_z)\sin\delta_f \\ (v_x + w_f\Omega_z)\cos\delta_f + (v_y + l_f\Omega_z)\sin\delta_f \\ (v_x - w_r\Omega_z)\cos\delta_r + (v_y - l_r\Omega_z)\sin\delta_r \\ (v_x + w_r\Omega_z)\cos\delta_r + (v_y - l_r\Omega_z)\sin\delta_r \end{bmatrix} \qquad \text{Eq. (2)}$$

Here it is assumed that the left and right front/rear wheel angles $\delta_f$ and $\delta_r$ are identical. In the following we assume for simplicity that the rear wheel angle $\delta_r$ is zero. Thus, it is assumed that the vehicle is more or less going straight ahead.

The longitudinal wheel slip is defined as:

$$s_i = \frac{\omega_i r_i - v_x^{P_i}}{v_x^{P_i}} \qquad \text{Eq. (3)}$$

Here $r_i$ is the effective wheel radius of the $i^{th}$ tire.

Next we consider the relation between longitudinal tire slip $s_i$ and the applied normalized longitudinal tire force $f_i$. The results are however straightforward to extend to the case with so-called combined slip.

In the literature an abundance of models relating the wheel slip $s_i$ and the applied normalized traction force $f_i$ can be found. In this analysis only static models are considered.

A tire-force model common in the vehicle dynamics literature is the "brush-model", which states:

$$f_i = \begin{cases} k_i s_i - \frac{s_i|s_i|k_i^2}{3\mu_i} + \frac{s_i^3 k_i^3}{27\mu_i^2}, & |s_i| < \frac{3\mu_i}{k_i} \\ \mu_i \text{sgn}(s_i), & \text{otherwise} \end{cases} \qquad \text{Eq. (4)}$$

Here $k_i$ is the longitudinal tire stiffness parameter and $\mu_i$ is the friction coefficient of the $i^{th}$ tire.

The brush-model is derived from physical considerations. An example of a "curve-fitting-like" non-physical tire-force model is $$f_i = \mu_i \tanh\left(\frac{k_i}{\mu_i} s_i\right) \qquad \text{Eq. (5)}$$

An advantage of this "curve-fit" model is that there is an analytic inverse model readily available:

$$s_i = \frac{\mu_i}{k_i} \tanh^{-1}\left(\frac{f_i}{\mu_i}\right) \qquad \text{Eq. (6)}$$

The inverse tire-force model is well defined as long as $|f_i| \le \mu_i$.

The exact form of the tire-force model is not important for the development below. Hence, in the following it is simply assumed that the following static tire-force models are available:

$$f_i = g(s_i; \theta_i)$$

$$s_i = g^{-1}(f_i; \theta_i) \qquad \text{Eq.(7)}$$

Here $\theta_i$ is a vector containing the parameters of the model; e.g., $\theta_i = [k_i \, \mu_i]$.

When the "active" friction measurement is on-going, torque is applied on all wheels simultaneously. As mentioned earlier, this means that there are no undriven wheels available for longitudinal vehicle 1 speed $v_x$ estimation. Hence, a technical challenge with active friction $\mu$ measurement is to handle the fact that the vehicle longitudinal velocity $v_x$ is difficult to estimate. The method described herein is based on the idea described in the following, i.e., to eliminate the longitudinal velocity $v_x$ from the equations. To achieve this, first re-write the expression for longitudinal slip:

$$s_i = \frac{\omega_i r_i - v_x^{P_i}}{v_x^{P_i}} \Rightarrow \omega_i r_i = v_x^{P_i}(1 + g^{-1}(f_i; \theta)) \qquad \text{Eq. (8)}$$

Next perform the computation of "Front Left tire/Rear Left tire":

$$\frac{\omega_1 r_1}{\omega_3 r_3} = \frac{v_x^{P_1}(1 + g^{-1}(f_1; \theta_1))}{v_x^{P_3}(1 + g^{-1}(f_3; \theta_3))} \qquad \text{Eq. (9)}$$

Assume the following:
$w_f \approx w_r$, i.e., that the half front track width and the half rear track width are essentially the same.
$\cos \delta_f \approx 1$ i.e., that the front wheels steering angles are small, essentially 0°.
$\sin \delta_f \approx \delta_f$
$r_i = r_0 + \tau_i$, where $r_0$ is the nominal (known) effective wheel radius and $\tau_i$ is a small unknown offset.
Then the following expression follows:

$$\frac{\omega_1}{\omega_3} = \left(1 + \frac{\tau_3 - \tau_1}{r_0}\right)\left(1 + \frac{(v_y + l_f\Omega_z)\delta_f}{v_x - w_r\Omega_z}\right)\frac{(1 + g^{-1}(f_1; \theta_1))}{(1 + g^{-1}(f_3; \theta_3))} \qquad \text{Eq. (10)}$$

As stated at the outset, a technical challenge with the active friction measurement algorithm is that the longitudinal velocity $v_x$ is difficult to estimate. The good news now is that the effect from the longitudinal velocity $v_x$ is small as long as the longitudinal velocity $v_x$ is large and the wheel angle $\delta_f$ and/or the yaw-rate $\Omega_z$ are/is small. A small wheel angle $\delta_f$ and/or yaw-rate $\Omega_z$ mean that the vehicle 1 will be travelling essentially straight ahead.

Hence, a reasonable approximation is:

$$\frac{(v_y + l_f\Omega_z)\delta_f}{v_x - w_r\Omega_z} \approx 0 \qquad \text{Eq. (11)}$$

In one embodiment, the first and second thresholds ($v_{xthres}, \delta_{thres}, \Omega_{zthres}$) are set so that the magnitude of the left side of the above equation (Eq. (11)) does not exceed 0.1.

Note also that in practice it is no limitation to assume that the vehicle 1 is more or less going straight ahead since increasing the axle torque potentially may cause vehicle 1 instability when travelling in a curve. Hence, typically active friction measurement will, in accordance with the embodiments herein, be performed when the vehicle 1 is travelling essentially straight ahead.

To proceed, define the parameter $$\rho_{31} = \frac{\tau_3 - \tau_1}{r_0}$$

and simplify according to the above approximation for the left hand side of the vehicle:

$$\frac{\omega_1}{\omega_3} = (1 + \rho_{31})\frac{(1 + g^{-1}(f_1; \theta_1))}{(1 + g^{-1}(f_3; \theta_3))} \qquad \text{Eq. (12)}$$

Similarly, for the right hand side of the vehicle, define the parameter $$\rho_{42} = \frac{\tau_4 - \tau_2}{r_0}$$

and simplify according to the above approximation for the right hand side of the vehicle:

$$\frac{\omega_2}{\omega_4} = (1 + \rho_{42})\frac{(1 + g^{-1}(f_2; \theta_2))}{(1 + g^{-1}(f_4; \theta_4))} \qquad \text{Eq. (13)}$$

Based on the above models, the following sections outline varieties of the method for friction estimation according to embodiments herein.

According to embodiments herein these varieties of the method for estimating a friction coefficient $\mu$ between tires of a wheeled two-axis two-track road vehicle 1 and the ground, comprises the steps of: if the longitudinal velocity of the vehicle 1 is above a first threshold $v_{xthres}$ and the wheel angle $\delta_f$ and/or the yaw rate $\Omega_z$ is below a second threshold $\delta_{thres}/\Omega_{zthres}$, applying a positive torque to both wheels on a first axle and an and opposite, negative torque, to both wheels on a second axle while following driver requested longitudinal vehicle 1 acceleration $a_x$; measuring wheel speeds $\omega_i$; estimating tire forces $f_i$; estimating the friction coefficient $\mu_i$ between the tires and the ground from the measured wheel speeds $\omega_i$ and the estimated tire forces $f_i$; making the estimated friction coefficient $\mu_i$ available to other vehicle systems.

According to embodiments hereof the wheel speeds $\omega_i$ are measured using wheel speed sensors, and the tire forces $f_i$ are estimated from measurements of vehicle acceleration $a$ and yaw rate $\Omega_z$ provided by a vehicle inertial measurement unit.

Also, according to embodiments herein the estimated friction coefficient $\mu_i$ is made available to other vehicle systems on a vehicle information network, such as a controller area network (CAN bus), Media Oriented Systems Transport (MOST) network.

In the following will be outlined alternative algorithms for the above estimation.

The basic idea in a first algorithm, described in the following section, is to assume that the tire/road friction coefficient $\mu_i$ is high (around 1). Assuming that the tire/road-friction coefficient $\mu_i$ is high, it is safe to assume that the inverse tire-force model is linear:

$$g^{-1}(f_i; \theta_i) = \frac{1}{k_i} f_i \quad 5$$

and that the slip is small: $|g^{-1}(f_i; \theta_i)| \ll 1$. Then the following approximations are applicable:

$$\frac{\omega_1}{\omega_3} - 1 = \rho_{31} + \frac{1}{k_1} f_1 - \frac{1}{k_3} f_3 \quad \text{Eq. (14)}$$

$$\frac{\omega_2}{\omega_4} - 1 = \rho_{42} + \frac{1}{k_2} f_2 - \frac{1}{k_4} f_4$$

The algorithm steps are as follows:

Use recursive least squares, Kalman filtering or similar standard signal processing tool during "normal" driving (i.e., during driving situations where the applied normalized traction force $f_i$ is small to ensure that the estimated tire stiffness C is not affected by the friction) to estimate the unknown parameters $\rho_{31}$, $\rho_{42}$, $k_1$, $k_2$, $k_3$, $k_4$.

During the active friction measurement, compute the model prediction errors (where it hence is assumed that estimates of the unknown $\rho_{31}$, $\rho_{42}$, $k_1$, $k_2$, $k_3$, $k_4$ parameters are available):

$$\varepsilon_{31} = \frac{\omega_1}{\omega_3} - 1 - \left(\rho_{31} + \frac{1}{k_1} f_1 - \frac{1}{k_3} f_3\right) \quad \text{Eq. (15)}$$

and $$\varepsilon_{42} = \frac{\omega_2}{\omega_4} - 1 - \left(\rho_{42} + \frac{1}{k_2} f_2 - \frac{1}{k_4} f_4\right)$$

If the average of the squared model prediction errors is too large, suspect low-$\mu$, i.e., low tire/road friction.

Thus, as mentioned above, according to embodiments herein the method thus further comprises estimating longitudinal tire stiffness parameters $k_1$, $k_2$, $k_3$, $k_4$ using Kalman filtering or similar signal processing tool during driving situations where an applied normalized traction force $f_i$ is small.

The rationale of the proposed algorithm is essentially to evaluate the likelihood of the high-$\mu$ hypothesis. The empirical experience is that the variance of the model prediction errors $\varepsilon_{31}$ and $\varepsilon_{42}$ increases as the utilized friction gets close to the friction limit.

A variation of this theme is actually to estimate all unknown linear parameters $\rho_{31}$, $\rho_{42}$, $k_1$, $k_2$, $k_3$, $k_4$ during the friction measurement, and compute the resulting prediction error variance. This approach however puts greater demands on the trajectory of the force excitation; since identifiability of the parameters above has to be guaranteed.

The basic of the algorithm described in the following section is to estimate the friction parameter from a parametric tire-force model such as the "curve-fit" model described earlier.

Thus in some embodiments herein the friction coefficient $\mu$ is estimated using a tire model comprising a physical relationship between wheel slip $s_i$ and tire forces f, whereby in some embodiments the friction coefficient $\mu$ is estimated using a parametric tire-force model, such as a curve-fit model.

The details in the algorithm are as follows:

Use recursive least squares, Kalman filtering or similar standard signal processing tool during "normal" driving (i.e., during driving situations where the applied normalized traction force $f_i$ is small to ensure that the estimated tire stiffness is not affected by the friction) to estimate the unknown parameters $\rho_{31}$, $\rho_{42}$, $k_1$, $k_2$, $k_3$, $k_4$. This can be achieved using the models $$\varepsilon_{31} = \frac{\omega_1}{\omega_3} - 1 - \left(\rho_{31} + \frac{1}{k_1} f_1 - \frac{1}{k_3} f_3\right) \quad \text{Eq. (16)}$$

and $$\varepsilon_{42} = \frac{\omega_2}{\omega_4} - 1 - \left(\rho_{42} + \frac{1}{k_2} f_2 - \frac{1}{k_4} f_4\right)$$

During the active friction measurement, use the following models (assuming for simplicity that the tire/road friction coefficient is identical on both wheels on the same side: $\mu_1 = \mu_3 = \mu_{le}$ i.e., left hand side, and $\mu_2 = \mu_4 = \mu_{ri}$ i.e., right hand side)

$$\frac{\omega_1}{\omega_3} = (1 + \rho_{31}) \frac{\left(1 + \frac{\mu_{le}}{k_1} \tanh^{-1}\left(\frac{f_1}{\mu_{le}}\right)\right)}{\left(1 + \frac{\mu_{le}}{k_3} \tanh^{-1}\left(\frac{f_3}{\mu_{le}}\right)\right)} \quad \text{Eq. (17)}$$

and $$\frac{\omega_2}{\omega_4} = (1 + \rho_{42}) \frac{\left(1 + \frac{\mu_{ri}}{k_2} \tanh^{-1}\left(\frac{f_2}{\mu_{ri}}\right)\right)}{\left(1 + \frac{\mu_{ri}}{k_4} \tanh^{-1}\left(\frac{f_4}{\mu_{ri}}\right)\right)}$$

As before, it is assumed that estimates of the unknown parameters $\rho_{31}$, $\rho_{42}$, $k_1$, $k_2$, $k_3$, $k_4$ are available.

Based on the above models, standard signal processing tools such as extended Kalman filtering, particle filtering, grid search, etc., can be used to estimate the friction coefficient $\mu$.

The reason for separating the estimation of the parameters $\rho_{31}$, $\rho_{42}$, $k_1$, $k_2$, $k_3$, $k_4$ from the problem of estimating the friction $\mu$ is that it is considered more difficult to estimate all these parameters $\rho_{31}$, $\rho_{42}$, $k_1$, $k_2$, $k_3$, $k_4$ jointly during the active friction measurement period.

Note that the estimation problem can be simplified by assuming that the ratio between the front/rear tire stiffness parameters $C_F$, $C_R$ are known; which is a reasonable assumption when the vehicle 1 normal force distribution is known.

The basic idea behind a second algorithm, described in the following section, is to identify the unknown tire parameters of a brush model with a parabolic pressure distribution. Assuming that the vehicle has more weight on the front axle than on the rear axle, the front tires will operate in the linear range of the force-slip curve even when the rear tires are at higher excitation levels. The following model, where the index F indicates front and index R indicates rear, can then be derived:

Express $v_x$ as a function of the front tire slip ratio $$\sigma_{xF} = \frac{r_F \omega_F - v_x}{r_F \omega_F} \Rightarrow v_x = r_F \omega_F (1 - \sigma_{xF}) \quad \text{Eq. (18)}$$

The front tire slip ratio can also be expressed as $$\sigma_{xF} = \frac{f_{xF}}{C_R} = \frac{f_{xF} f_{zR}}{f_{zF} C_R} \quad \text{Eq. (19)}$$

And the rear tire slip ratio is defined as below to fit with the brush model used (negative slip gives positive force):

$$\sigma_{xR} = \frac{v_x - r_R \omega_R}{r_R \omega_R} \quad \text{Eq. (20)}$$

with Equations 18 and 19 and assuming that the slip stiffness $$C_F = \frac{f_{zF}}{f_{zR}} C_R = \quad \text{Eq. (21)}$$

$$> \sigma_{xR} = \frac{r_F \omega_F - r_R \omega_R}{r_R \omega_R} - \frac{f_{xF} f_{zR} r_F \omega_F}{f_{zF} C_R r_R \omega_R} = \sigma'_{xR} - \frac{f'_{FxF}}{C_R}$$

The modified brush model is then from Equation 18 assuming parabolic pressure distribution:

$$F_x = -C_R \sigma_{xR} + \frac{(C_R \sigma_{xR})^2}{3 \mu f_{zR}} - \frac{(C_R \sigma_{xR})^3}{27(\mu f_{zR})^2} = \ldots = \quad \text{Eq. (22)}$$

$$f'_{FxF} - C_R \sigma'_{xR} + \frac{(C_R \sigma'_{xR} - f'_{FxF})^2}{3 \mu f_{zR}} - \frac{(C_R \sigma'_{xR} - f'_{FxF})^3}{27 \mu^2 f_{zR}^2}$$

From this new modified brush model it is possible to estimate the two tire parameters $C_R$ and $\mu$ without estimating the reference velocity $v_x$. Use standard signal processing tools such as extended Kalman filter, particle filtering, grid search, etc., to estimate the unknown parameters.

It is assumed that estimates of tire forces $f_{xF}$, $f_{xR}$, $f_{zR}$, $f_{zF}$ and effective wheel radii $r_R$, $r_F$ are available. It is further assumed that the wheel speeds $\omega_1$, $\omega_2$, $\omega_3$, $\omega_4$ are measured, This model assumes that the slip stiffness C is a linear function of the vertical load $f_z$. Real tires have a small nonlinearity in this relation. However, for the purpose of the estimator this nonlinearity can be neglected.

Thus, as mentioned above, according to embodiments herein the method thus further comprises estimating longitudinal tire stiffness parameters $k_1$, $k_2$, $k_3$, $k_4$ using Kalman filtering or similar signal processing tool during driving situations where an applied normalized traction force $f_i$ is small.

The same approach as above can be used on each side of the vehicle 1 individually. This is done by simply taking half of the estimated forces on the front and rear axle for each side of the vehicle 1. These should be equal if the vehicle 1 is equipped with an open differential and the same brake pressure is applied to the left and right side. $\sigma'_{xR}$ should then be calculated for the left and the right side separately, which is easily done using the wheel speed sensors.

Thus in some embodiments herein the friction coefficient $\mu$ is estimated using a tire model comprising a physical relationship between wheel slip $s_i$ and tire forces $f_i$, whereby in some embodiments the friction coefficient $\mu$ is estimated using a brush model.

In accordance with the present disclosure is also envisaged a wheeled two-axis two-track road vehicle 1 comprising an arrangement as described in the foregoing.

A wheeled two-axis two-track road vehicle 1 which comprises an arrangement for estimating a friction coefficient $\mu$ between tires of a wheeled two-axis two-track road vehicle 1 and the ground, as above, is able to provide friction estimates to any vehicle systems requiring such in a non-intrusive manner whilst the vehicle 1 is travelling essentially straight ahead.

As one skilled in the art would understand, any of the above-mentioned logic, controllers, units and other components, such as components 2, 3, 4, 5, 6, 7, 8, 9 and 10, may include suitable hardware and/or software, such as one or more processors (e.g., one or more microprocessors, microcontrollers and/or programmable digital signal processors) in communication with one or more storage devices or media including computer readable program instructions that are executable by the one or more processors so that the particular component may perform particular algorithms represented by the functions and/or operations described herein. Each logic, controller, unit and other component (e.g., 2, 3, 4, 5, 6, 7, 8, 9 and 10) may also, or instead, include one or more application specific integrated circuits, programmable gate arrays or programmable array logic, programmable logic devices, or digital signal processors.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

What is claimed is:

1. A method for estimating a friction coefficient ($\mu_i$) between tires of a wheeled two-axis two-track road vehicle and ground, the method comprising:
    when longitudinal velocity ($v_x$) of the vehicle is above a first threshold ($v_{xthres}$) and wheel angle ($\delta_f$) or yaw rate ($\Omega_z$) is below a respective second threshold ($\delta_{thres}$/$\Omega_{zthres}$), applying a positive torque to both wheels on a first axle and an opposite, negative torque, to both wheels on a second axle while following driver requested longitudinal vehicle (1) acceleration ($a_x$);
    measuring wheel speeds ($\omega_i$);
    estimating tire forces ($f_i$);
    estimating the friction coefficient ($\mu_i$) between the tires and the ground from the measured wheel speeds ($\omega_i$) and the estimated tire forces ($f_i$);
    making the estimated friction coefficient ($\mu_i$) available to other vehicle systems.

2. The method according to claim 1 wherein application of the positive torque is made using a vehicle propulsion system and application of the negative torque is made using a vehicle braking system.

3. The method according to claim 1 wherein the wheel speeds ($\omega_i$) are measured using wheel speed sensors.

4. The method according to claim 1 wherein the tire forces ($f_i$) are estimated from measurements of vehicle acceleration (a) and yaw rate ($\Omega_z$) provided by a vehicle inertial measurement unit.

5. The method according to claim 1 wherein the friction coefficient ($\mu_i$) is estimated using a tire model comprising a physical relationship between wheel slip ($s_i$) and the tire forces ($f_i$).

6. The method according to claim 5 wherein the tire model is a brush model.

7. The method according to claim 1 wherein the friction coefficient ($\mu_i$) is estimated using a parametric tire-force model.

8. The method according to claim 7 wherein the tire-force model is a curve-fit model.

9. The method according to claim 1 further comprising estimating longitudinal tire stiffness parameters using Kalman filtering or other signal processing tool during driving situations where an applied normalized traction force ($f_t$) is small.

10. The method according to claim 1 wherein the estimated friction coefficient ($\mu_i$) is made available to other vehicle systems on a vehicle information network.

11. The method according to claim 10 wherein the vehicle information network comprises a controller area network (CAN bus) or Media Oriented Systems Transport (MOST) network.

12. The method according to claim 1 wherein the friction coefficient ($\mu_i$) is estimated based on a physical relationship between wheel slip and tire forces.

13. An arrangement for estimating a friction coefficient ($\mu_i$) between tires of a wheeled two-axis two-track road vehicle and ground, the arrangement comprising:
    an activation logic for determining when longitudinal velocity $v_x$ of the vehicle is above a first threshold ($v_{xthres}$) and wheel angle ($\delta_f$) and/or yaw rate ($\Omega_z$) are/is below a respective second threshold ($\delta_{thres}/\Omega_{zthres}$);
    a vehicle controller for controlling application of a positive torque to both wheels on a first axle and an opposite, negative torque, to both wheels on a second axle while following driver requested longitudinal vehicle acceleration ($a_x$) if determined that the longitudinal velocity $v_x$ of the vehicle is above the first threshold ($v_{xthres}$) and the wheel angle ($\delta_f$) or the yaw rate ($\Omega_z$) is below the respective second threshold ($\delta_{thres}/\Omega_{zthres}$);
    wheel speed sensors for measuring wheel speeds ($\omega_i$);
    a tire force estimating unit for estimating tire forces ($f_i$);
    a friction estimator for estimating the friction coefficient ($\mu_i$) between the tires and the ground from the measured wheel speeds $\omega_i$ and the estimated tire forces ($f_i$); and
    a communication unit for making the estimated friction coefficient ($\mu_i$) available to other vehicle systems.

14. The arrangement according to claim 13 wherein the friction estimator is configured to estimate the friction coefficient ($\mu_i$) between the tires and the ground using a tire model comprising a physical relationship between wheel slip ($s_i$) and tire forces ($f_i$).

15. The arrangement according to claim 14 wherein the tire model is a brush model.

16. An arrangement according to claim 14 wherein the tire model is a parametric tire-force model.

17. A wheeled two-axis two-track road vehicle comprising the arrangement according to claim 13.

18. The arrangement according to claim 13 wherein the friction estimator is configured to estimate the friction coefficient ($\mu_i$) based on a physical relationship between wheel slip and tire forces.

19. An arrangement for estimating a friction coefficient ($\mu_i$) between tires of a wheeled two-axis two-track road vehicle and ground, the arrangement comprising:
    a vehicle controller for controlling application of a positive torque to both wheels on a first axle and an opposite, negative torque, to both wheels on a second axle while following driver requested longitudinal vehicle acceleration ($a_x$) when determined that longitudinal velocity ($v_x$) of the vehicle is above a first threshold ($v_{xthres}$) and at least one of wheel angle ($\delta_f$) or yaw rate ($\Omega_z$) is below a respective second threshold ($\delta_{thres}$, $\Omega_{zthres}$);
    wheel speed sensors for measuring wheel speeds ($\omega_i$);
    a tire force estimating unit for estimating tire forces ($f_i$);
    a friction estimator for estimating the friction coefficient ($\mu_i$) between the tires and the ground from the measured wheel speeds $\omega_i$ and the estimated tire forces ($f_i$); and
    a communication unit for making the estimated friction coefficient ($\mu_i$) available to other vehicle systems.

20. The arrangement according to claim 19 wherein the friction estimator is configured to estimate the friction coefficient ($\mu_i$) based on a physical relationship between wheel slip and tire forces.

* * * * *